US 6,567,395 B1

(12) United States Patent
Miller

(10) Patent No.: US 6,567,395 B1
(45) Date of Patent: May 20, 2003

(54) DISPLAY FOR A HIGH FREQUENCY (HF) RADIO

(75) Inventor: David A. Miller, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/266,075

(22) Filed: Mar. 10, 1999

(51) Int. Cl.[7] .............................................. H04B 7/212
(52) U.S. Cl. ........................ 370/347; 701/120; 701/117; 370/345
(58) Field of Search ................................ 455/566, 434, 455/466, 431, 97; 370/345, 347, 321, 337

(56) References Cited

U.S. PATENT DOCUMENTS 6,014,374 A * 1/2000 Paneth et al. ............... 370/345
6,195,609 B1 * 2/2001 Piley et al. .................. 701/120
6,421,328 B1 * 7/2002 Larribeau et al. ........... 370/329

* cited by examiner

*Primary Examiner*—Nay Muang
*Assistant Examiner*—Tanmay Lele
(74) *Attorney, Agent, or Firm*—Nathan O. Jensen; Kyle Eppele

(57) ABSTRACT

A radio transceiver includes an alternate channel searching algorithm that reduces alternate channel search times. The alternate channel search algorithm determines the actual availability of alternate channels by receiving squitter messages. The alternate channels are ranked according to signal-to-noise ratios and displayed for selection by an operator. The squitter messages are received while the radio is not communicating on the main channel.

11 Claims, 3 Drawing Sheets

Microfiche Appendix Included
(2 Microfiche, 178 Pages)

DISPLAY FOR A HIGH FREQUENCY (HF) RADIO

CROSS REFERENCE TO RELATED APPLICATION

This application is related in its disclosure to the subject matter disclosed in the following application by David A. Miller, U.S. Ser. No. 09/266,074, filed on an even date herewith, entitled "HF Radio System With Concurrent and Quicker Channel Search Capabilities".

COPYRIGHT NOTICE

A portion of the disclosure including microfiche Appendix A of this patent document contains material which is subject to copyright protection. The copyright or owner has no objection to the facsimile reproduction by any-one of the patent document or the patent disclosure, as it appears in the Patent and Trademark Office patent file or records, but otherwise reserves all (copyright or mask work) rights whatsoever.

CROSS REFERENCE TO APPENDICES

The present application includes a computer listing on microfiche Appendix A attached hereto. Microfiche Appendix A includes frames 1–178 disposed on 2 sheets.

FIELD OF THE INVENTION

The present invention relates generally to radio frequency (RF) communication systems. More particularly, the present invention relates to channel searching techniques for radio transceivers.

BACKGROUND OF THE INVENTION

Radio systems are utilized in diverse applications to provide a variety of communication operations. Radio systems, such as, the commercial high-frequency (HF) data link radio, can be used to support air traffic control (ATC) and airline operational control (AOC). The HF data link radio can be used to transmit and receive voice, tactical, data, and navigational messages between aircraft and ground stations.

Radios or transceivers generally communicate messages on a channel of a communication link in accordance with a protocol associated with the communication link. For example, commercial HF data link radios or transceivers transmit and receive messages on one of about 400 channels in the frequency range between 2–30 Megahertz (MHZ). Each channel has a bandwidth of approximately 1800 bytes per second.

Commercial HF data link radios communicate ATC and AOC messages in accordance with a time division multiplexing scheme, such as, the time division multiplex access (TDMA) protocol defined in Aeronautical Radio, Inc. (Air Inc.) specification 635. The TDMA protocol allows several radios to use a single channel without interference from each other.

Conventional radio systems establish contact or connections on a channel in accordance with the protocol associated with the data link. The radio system is tuned to the appropriate channel and transmits and receives messages in accordance with the protocol. According to the commercial HF data link radio example, the airborne radio system establishes contact or connects to a base station on a particular HF frequency (e.g., channel). The radio system connects or logs on by receiving a squitter message on a particular channel and transmits information in accordance with the squitter message on the particular channel.

The particular channel (e.g., the main channel) is selected by the HF Data Link frequency search algorithm in accordance with the signal-to-noise ratios that have been experienced on the received frequencies. The HF data link frequency search algorithm attempts to choose a robust channel that will be available for the entire communication session with a ground station. Nonetheless, radio systems can have contact broken or lose the connection due to a variety of internal and external conditions. For example, an aircraft utilizing HF data link may lose contact at any time due to operational conditions of the radio system, geographic conditions (e.g., mountains and valleys), distance, weather, solar conditions, and other external situations. In radio systems, particularly HF data link radio systems utilized in aircraft applications, the amount of time during which the radio system is incapable of communicating (e.g., lost contact time) should be minimized.

In conventional voice HF operations, when the radio system loses connectivity, the radio operator must search for another channel. The search can be augmented by various products and techniques which can help the radio operator predict the availability of alternative channels (channels other than the main channel, which is no longer operational). Additionally, the skill and experience of the radio operator are extremely important when determining the availability of alternate channels. Even with a highly skilled radio operator, the time spent searching for alternate channels adversely affects the operation of the radio system. In fact, search times for alternative channels can be as long as several minutes. Once a suitable alternative channel is found, connectivity is reestablished on the alternate channel, which then becomes the main channel.

Thus, there is a need for a radio system that reduces search time associated with selecting alternate channels. Further still, there is a need for an automatic channel search algorithm that can automatically select a channel for HF data link operations, and make a list of best available alternate channels for human-operator use. Further still, there is a need for a channel selection algorithm that does not affect communication on the main channel.

SUMMARY OF THE INVENTION

The present application relates to a transceiver apparatus for use with a high frequency (HF) radio communication system. The communication system includes a plurality of channels. The transceiver apparatus communicates information on a selected channel of the channels. The transceiver apparatus determines the actual availablity of at least one different channel of the channels. The transceiver apparatus displays visual indicia of the actual availability of the at least one different channel.

The present invention further relates to a radio capable of receiving radio signals on an HF data link. The radio signals are communicated on at least a first channel, a second channel and a third channel. The radio signals are communicated in accordance with a time division multiplex protocol including a plurality of time slots. A first squitter message is provided on the first channel in a first time slot, and a second squitter message is provided on the second channel in a second time slot. A third squitter message is provided on the third channel in a third time slot. The radio includes control means for monitoring actual availability of at least the second channel in response to the second squitter message while communicating information on the first channel in accordance with the time division multiplex protocol. The radio also includes display means for displaying an indicia of at least the second channel based upon the actual availability of the second channel.

The present invention still further relates to a method of determining availability of alternative channels on an HF link. The method includes communicating in at least one assigned time slot on a main channel, determining the actual availability of the at least one alternative channel, and providing an indication of the actual availability.

BRIEF DESCRIPTION OF THE DRAWINGS

The present invention will hereafter be described with reference to the accompany drawings, wherein like numerals denote like elements and.

DETAILED DESCRIPTION OF THE PREFERRED EMBODIMENTS

Figure 1:
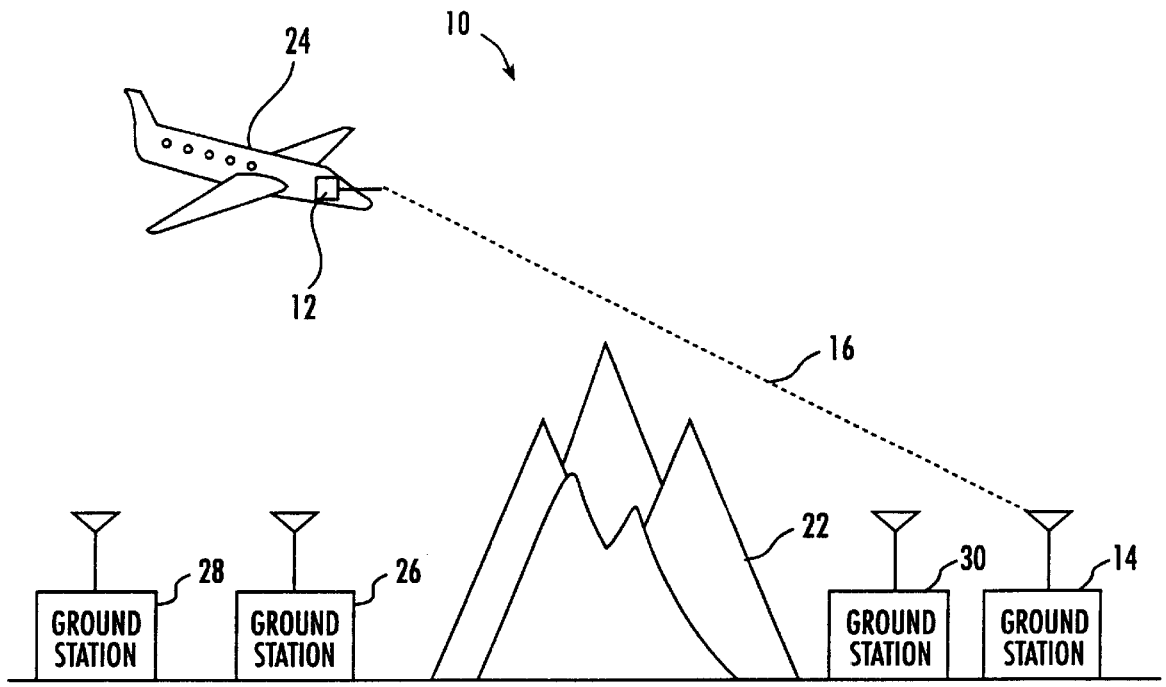
FIG. 1 is a general block diagram of a communication system including a radio apparatus in accordance with an exemplary embodiment of the present invention.

With reference to FIG. 1, communication system 10 includes a radio unit or transceiver 12 and a radio unit or transceiver 14. Transceiver 12 communicates with transceiver 14 across a link 16. Preferably, communication system 10 operates according to a high frequency (HF) communication system, such as, the Aeronautical Radio, Inc. (ARINC) protocol (e.g., ARINC specification 635), although the principles of the present invention can be utilized with other protocols and other types of data links. Information, such as, data, voice, video, navigational, or other information, can be provided between transceiver 12 and transceiver 14.

Transceiver 14 is preferably a ground station, and transceiver 12 is preferably an airborne station provided in an airplane 24. Additionally, transceiver 12 can communicate with a ground-based radio unit or transceiver 26, 28, or 30. Further, transceivers 14, 26, 28, and 30 are also capable of communicating with other airborne stations similar to transceiver 12. Transceivers 14, 26, 28, and 30 are generally at fixed locations, and each communicates on a unique, preselected channel or frequency.

Transceiver 12 is advantageously equipped to determine availability of alternate channels to minimize synchronization to alternate channels (or alternate channel acquisition times for transceiver 12). For example, transceiver 12 determines the actual availability of alternate channels (channels other than the main channel upon which transceiver 12 is communicating). With the actual availability of alternative channels known, transceiver 12 automatically, can switch channels if the main channel becomes unoperational. Time is saved because an alternate channel search is not necessary.

During the main channel can become unoperational because of geographic objects, such as, a mountain range 22, weather conditions, solar conditions, other air traffic, or other interference.

Figure 2:
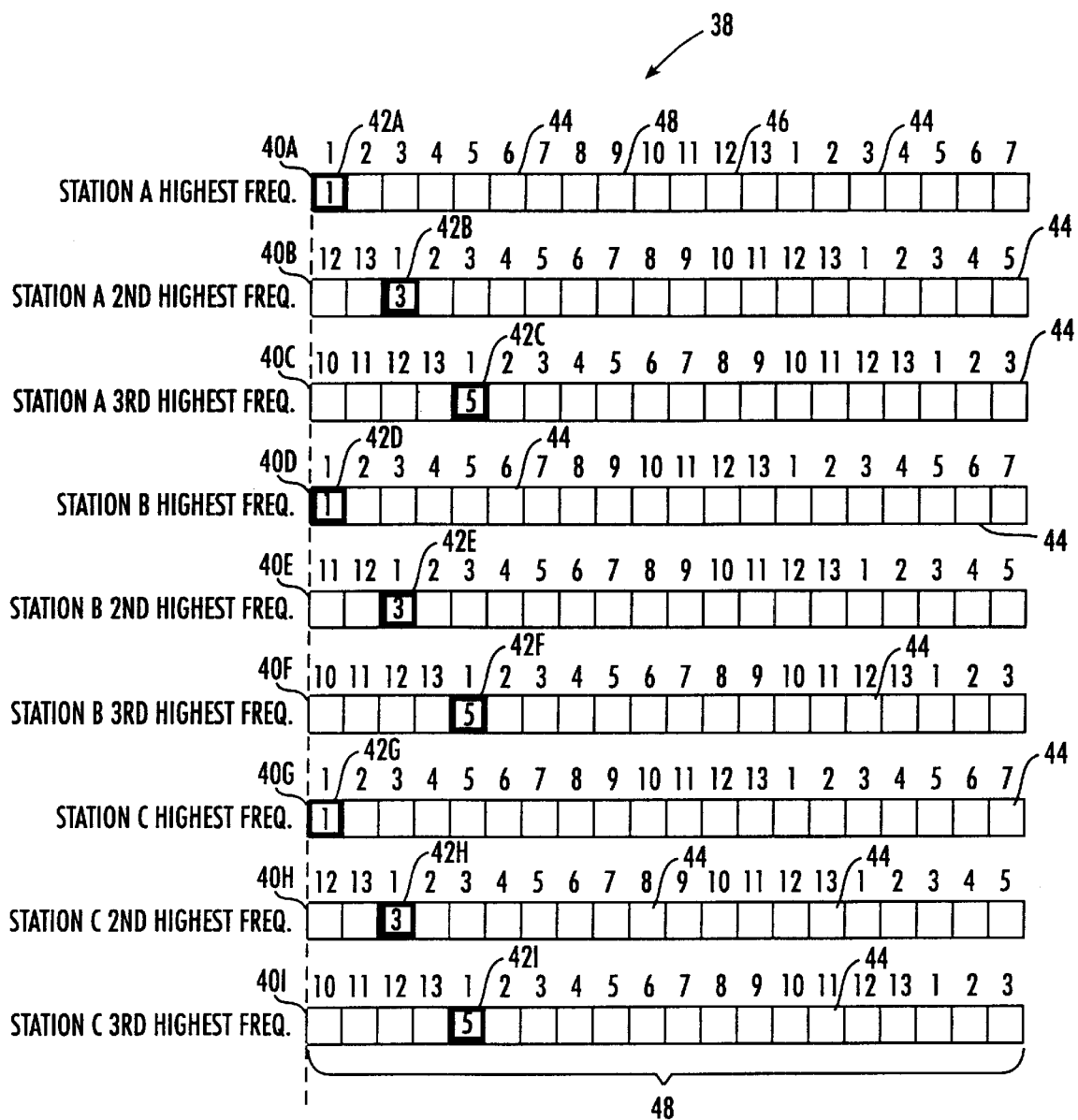
FIG. 2 is a timing diagram demonstrating a time division multiplexed protocol for the communication system illustrated in FIG. 1.

With reference to FIG. 2, communication system 10 can operate in accordance with a time division multiple access (TDMA) protocol. The TDMA protocol can be an ARINC protocol 38, such as, the ARINC specification 635.

ARINC protocol 38 includes a number of channels 40A-I. Channels 40A-I are preferably provided in a frequency range of 2 to 30 (MHz) and each has a bandwidth of 1800 bytes/second.

Each of transceivers 14, 26, 28, and 30 communicates on a unique channel of channels 40A-I. Alternatively, the protocol can have any number of channels frequency ranges and bandwidth. Channel 40A has the highest frequency, and channel 40I has the lowest frequency.

In FIG. 2, protocol 38 includes thirteen time slots 44 in a time frame 48. On each of channels 40A-I, a squitter message is provided in a squitter message time slot 42A-I respectively. Preferably, squitter message time slots 42A-I are spaced apart (in time) from other neighboring squitter message time slots 42A-I. Time slots 44 are preferably 2462 (32 seconds per frame/13 slots per frame/1000 milliseconds per second) milliseconds. Alternatively, time slots 44 can be any time period, and any number of time slots 44 in frame 48 can be utilized.

Generally, transceiver 14 (FIG. 1) provides a squitter message in the associated squitter time slot 42A-I for the preselected channel of channels 40A-I. As an example, transceiver 14 can provide the squitter message in slot 42A on channel 40A. The squitter message can include identification information, availability information, position information, and connection information.

Transceiver 12 receives the squitter information from transceiver 14 and communicates with transceiver 12 in time slots 44. Communication in the particular slots 44 is negotiated through the squitter message and is performed in accordance with protocol 38. For example, transceiver 12 may receive information on channel 40A in time slot 48 and transmit information in time slot 46 of channel 40A. The assignment of slots 44 for transmission of squitter messages, transmission of non-squitter messages and reception of non-squitter message can be governed by a variety of control schemes. Further, any method of negotiating time slots 44 and conveying protocol information can be utilized in accordance with the present invention.

When transceiver 12 is not able to communicate on a main channel (channel 40A associated with transceiver 14), transceiver 12 tunes to an alternate channel, such as, any of remaining channels 40B-I, to communicate with an alternative transceiver, such as, transceivers 26, 28; and 30. Once tuned to the alternate channel, transceiver 12 receives the appropriate squitter message in one of slots 42B-I and communicates on the alternative channel of channels 40B-I with the alternative transceiver in accordance with the appropriate protocol. The selected alternative channel 40B-I then becomes the main channel. Alternatively, when the radio tunes to the alternate channel, the squitter currently in affect on the alternate channel has already been received by the radio, and the radio can immediately begin data link operations on the alternate channel.

Alternatively, transceiver 12 can immediately become operational on the alternative channel. Transceiver 12 utilizes the previously received squitter message to begin data link operations (e.g., the squitter message received while transceiver 12 was logged onto the main channel). The data link operations can begin as soon as transceiver 12 tunes to the alternate frequency.

Transceiver 12 is capable of determining the actual availability of other channels 40B-I. The time for synchronization to the alternate channel is reduced because the actual availability of channels is known. Other channels 40B-I may not be available because of geographic situations, weather conditions, operation of transceivers 14, 26, 28 and 30 sun spot activity, or other considerations.

Figure 3:
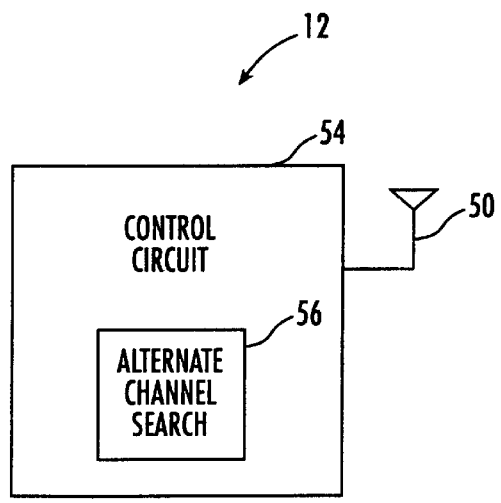
FIG. 3 is a block diagram of the radio apparatus illustrated in FIG. 1, in accordance with another exemplary embodiment of the present invention.

With reference to FIG. 3, transceiver 12 includes a control circuit 54 and an antenna 50. Radio frequency (RF) signals are provided via antenna 50. Control circuit 54 receives and transmits radio signals through antenna 50. Control circuit 54 includes an alternate channel search module 56.

Module 56 can be implemented in software, such as, the software described in Appendix A. Software provided in Appendix A is shown in exemplary fashion and does not limit the scope of the claim. Alternatively, hardware can be configured to perform the operations set forth in Appendix A.

Module 56 receives squitter messages 42A-I while transceiver 12 is communicating on (e.g., logged into) a main channel of channels 40A-I. Module 56 determines the actual availability of alternate channels by analyzing the signal strength associated with the received alternate squitter messages. Preferably, module 56 analyzes the signal-to-noise ratio associated with the squitter messages to determine which channel of channels 40A-I are available as alternate channels.

Module 56 ranks the alternate channels in accordance with the signal-to-noise ratio. The ranking is continually updated as alternate squitter messages are received. The signal-to-noise ratio is an indication of the closeness as well as the suitability of the alternate transceiver. Module 56 can track as many as 120 channels.

Alternate channel search module 56 can be updated with information indicative that channels 40A-I have been turned off or are unreachable due to geographic circumstances. In such circumstances, alternate channel search module 56 does not attempt to receive alternate squitter messages associated with those channels which are not available, thereby focusing more time receiving squitter messages from channels 40A-I, which may actually be available.

According to one particular control scheme set forth in Appendix A, module 56 includes a channel status table describing all ground-based transceivers, such as, transceivers 14, 26, 28, and 30, and the squitter offset for each of the stations. The information in the table can be broadcast periodically (e.g., every few hours or every day). In addition, transceiver 12 can request the information to be sent. The channel status table is used to determine whether an attempt to receive an alternative squitter message should be made.

According to another exemplary embodiment of the control scheme for module 56, a counter associated with each frequency or channel 40A-I tracks an alternate channel merit value. Every time a squitter message on channels 40A-I is received, the counter value is incremented by a value describing the squitter merit of the received squitter, that is the numeric value associated with the positive characteristics of the received squitter. Whenever the squitter message is listened for but not received, the counter value is divided by three. Only alternate squitter messages which have high counter values are attempted to be received by transceiver 12. After every frame, such as, frame 48, all squitter merit values are incremented. In this way, squitter merit values occasionally rise even if there has not been a recent attempt to receive it. Accordingly, transceiver 12 continually attempts to receive a diverse group of alternate squitter messages. Additionally, transceiver 12 focuses on those channels with the most preferred characteristics.

Figure 4:
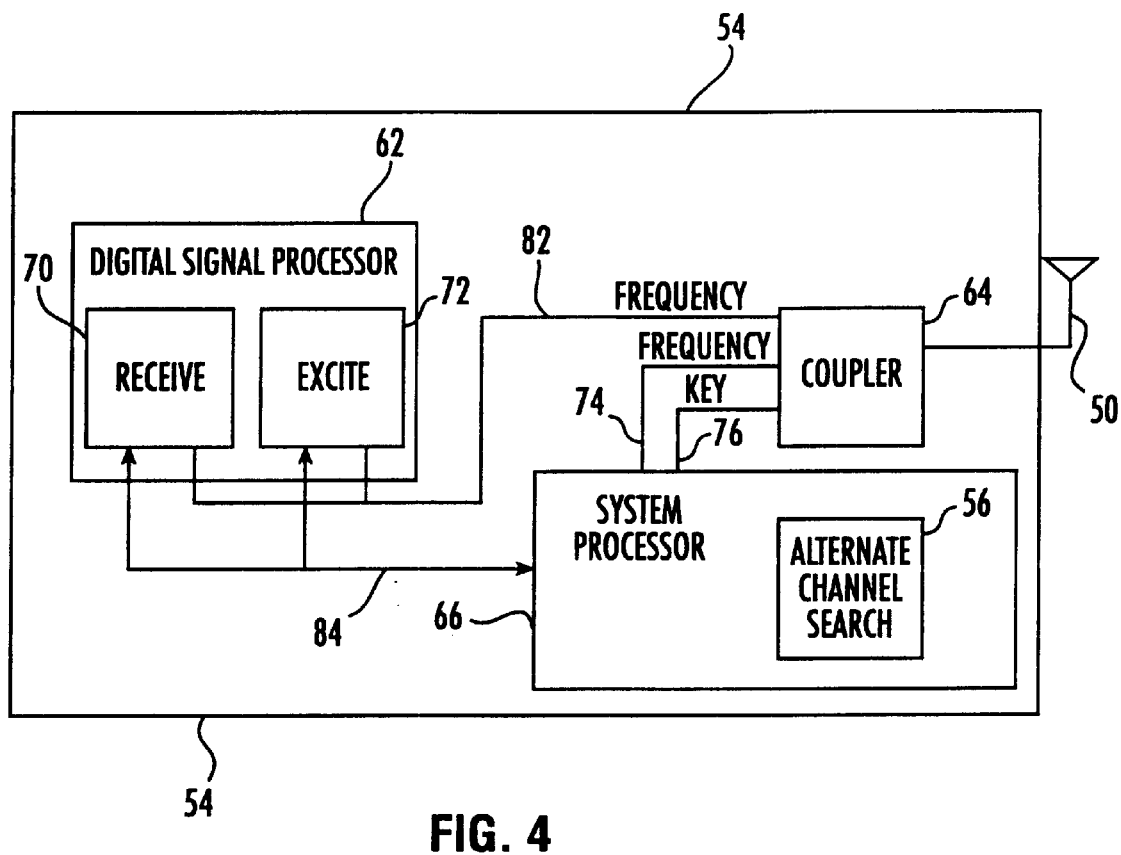
FIG. 4 is a more detailed block diagram of the radio apparatus illustrated in FIG. 3, in accordance with still another exemplary embodiment of the present invention.

With reference to FIG. 4, transceiver 12 includes control circuit 54, which includes a digital signal processor circuit 62, an antenna coupler 64, and a system processor 66. Digital signal processor circuit 62 includes a receive circuit 70 and an excite circuit 72. Receive circuit 70 and excite circuit 72 can be digital processing circuits, analog circuits, or combinations thereof. Coupler 64 can be a digital coupler or an analog coupler. System processor 66 includes alternate channel search module 56. Coupler 64 is coupled to antenna 50.

System processor 66 is coupled to antenna coupler 64 by a frequency line 74 and a key line 76. Coupler 64 is set to a particular frequency indicated by a code on frequency line 74. Coupler 64 is configured in accordance with the code on frequency line 74 when a key line enable signal is provided on line 76. Transmitter radio signals are provided from excite circuit 72 to coupler 64 across signal path 82. System processor 66 provides signals for modulation and transmission to excite circuit 72. Excite circuit 72 and coupler 64 are tuned to the chosen channel of channels 40A-I through a frequency control line 84 and frequency line 74.

System processor 66 controls the frequency associated with receive circuit 70 through frequency control line 84. Received signals are received from antenna 50 through coupler 64 across signal path 82 and into receive circuit 70. Receiver circuit 70 provides demodulated signals to processor 66. Received circuit 70, as well as coupler 64, is tuned by system processor 66.

When transceiver 12 is communicating on a main channel (logged on to one channels 40A-I), system processor 66 communicates in accordance with protocol 38. When system processor 66 is not actually receiving or transmitting data on the main channel, system processor 66 listens for any number squitter messages in squitter time slots 42A-I. Once system processor 66 receives the last bit associated with the squitter message on an alternate channel, system processor 66 tunes receive circuit 70 to another alternate frequency or to the main frequency. System processor 66 tunes to the main frequency if communication (either transmission or reception) is required in the next time slot 44 on the main channel. Thus, when, in accordance with the TDMA protocol, transceiver 12 is connected on a main channel but not actually receiving or transmitting, transceiver 12 scans for squitter messages on alternative channels. The channels for the alternative squitter messages can be chosen as described above with reference to FIG. 3.

Squitter messages are received through coupler 64 by receive circuit 70. Coupler 64 is maintained at the main channel frequency. However, system processor 66, through alternate channel search module 56, tunes receive circuit 70 to alternate frequencies associated with alternate channels 40A-I to receive squitter messages from squitter time slots 42A-I. With such a scheme, the time period associated with tuning coupler 64 is eliminated.

Module 56 ranks the alternate channels in accordance with signal-to-noise ratio associated with the squitter messages. Preferably, transceiver 12 can be equipped to receive a squitter message from squitter time slots 42A-I before or after a scheduled time of slots 44 is used for receiving or transmitting signals on the main channel. Module 56 preferably tallies a weighted average value representative of the signal-to-noise ratio. The average value is stored in a table.

Figure 5:
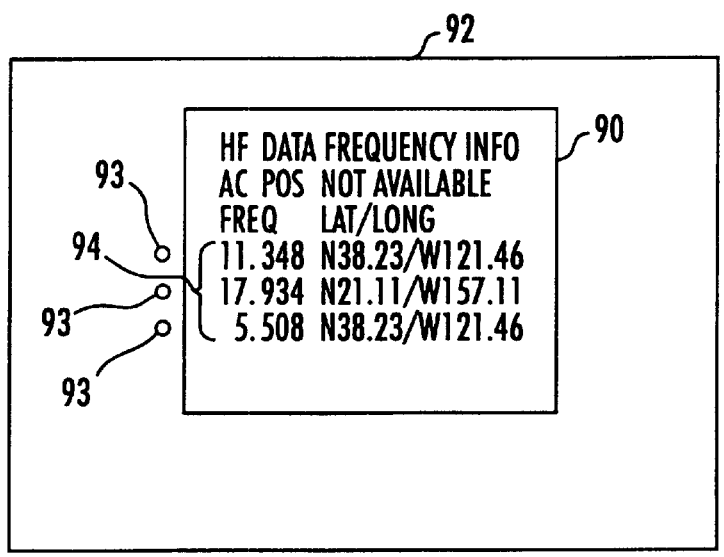
FIG. 5 is a block diagram of a display for the radio apparatus illustrated in FIG. 3.

With reference to FIG. 5, a display 90, which is shown as being part of a unit 92, can be coupled to system processor 66 for displaying the actual availability of channels. Channels 40A-I can be provided in a list format 94 by channel number, frequency number, or other indicia. Display 90 can be an LCD display, a CRT display, or other apparatus. Display 90 can even be an audio display that provides audio indications of alternative channels.

Display 90 shows the location (in longitude and latitude) of the transceiver associated with the channel. Display 90 can also provide an indication of the strength of each channel by percentage, signal-to-noise ratio, or other indicia. The radio operator can select an actual available channel via a control knob, a key pad or buttons 93. The benefit is that if the radio operator needs to talk to San Francisco, for example, and display 90 is indicating that 11.348 data frequency is working well, then the radio operator may select voice frequency 11.400 frequency to talk to San Francisco and expect that that frequency will provide good connectivity.

It is understood that, while the preferred embodiments and examples are given, they are for the purpose of illustration only. The scope of the claim is not limited by the precise details disclosed. For example, although actual availability of channels is monitored by signal-to-noise ratio associated with squitter messages, other signal strength techniques can be utilized. Thus, changes may be made to the details disclosed in the application without departing from the scope of the invention, which is defined by the following claims.

What is claimed is:

1. A transceiver apparatus for use with a high frequency (HF) radio communication system, the communication system including a plurality of channels, the transceiver apparatus communicating information on a selected channel of the channels, the transceiver apparatus determining the actual availability of at least one different channel of the channels, the transceiver apparatus displaying visual indicia of the actual availability of a plurality of different channels, wherein the transceiver apparatus displays two or more channels in a list format corresponding to signal strength associated with the channels, wherein the transceiver apparatus includes a user interface for selecting one of the two or more different channels, and wherein the transceiver apparatus communicates in an ARINC specified system.

2. The transceiver apparatus of claim 1, wherein the transceiver apparatus is part of a cockpit of an aircraft.

3. A radio capable of receiving radio signals on an HF data link, the radio signals being communicated on at least a first channel, a second channel, and a third channel, the radio signals being communicated in accordance with a time division multiplexed protocol including a plurality of time slots, wherein a first squitter message is provided on the first channel in a first time slot of the time slots, wherein a second squitter message is provided on the second channel in a second time slot of the time slots, wherein a third squitter message is provided on the third channel in a third time slot of the time slots, the radio comprising:

control means for monitoring actual availability of at least the second channel in response to the second squitter message while communicating information on the first channel in accordance with the time division multiplexed protocol;

display means for displaying an indicia of at least the second channel based upon the actual availability of the second channel; and interface means for allowing the second and third channel to be selected.

4. The radio of claim 3, wherein the control means monitors the availability of the third channel.

5. The radio of claim 4, wherein the control means ranks the second and third channels according to the most desired alternative channel and displays indicia of the most desired channel.

6. The radio of claim 5, wherein the control means determines the most desired alternative channel in response to a signal-to-noise ratio associated with the second squitter message and the third squitter message.

7. The radio of claim 3, wherein the communication system is an ARINC system.

8. The radio of claim 3, wherein the interface means is coordinated with the indicia.

9. A radio capable of receiving radio signals on an HF data link, the radio signals being communicated on at least a first channel, a second channel, and a third channel, the radio signals being communicated in accordance with a time division multiplexed protocol including a plurality of time slots, wherein a first squitter message is provided on the first channel in a first time slot of the time slots, wherein a second squitter message is provided on the second channel in a second time slot of the time slots, wherein a third squitter message is provided on the third channel in a third time slot of the time slots, the radio comprising:

control means for monitoring actual availability of at least the second and third channels in response to the second squitter message while communicating information on the first channel in accordance with the time division multiplexed protocol, wherein the control means ranks the second and third channels according to the most desired alternative channel and displays indicia of the most desired channel, and wherein the control means determines the most desired alternative channel in response to a signal-to-noise ratio associated with the second squitter message and the third squitter message;

display means for displaying an indicia of at least the second channel based upon the actual availability of the second channel; and interface means for allowing the second and third channels to be selected.

10. The radio of claim 9, wherein the communication system is an ARINC system.

11. The radio of claim 9, wherein the interface means is coordinated with the indicia.

* * * * *